(12) United States Patent
Otsuka et al.

(10) Patent No.: US 9,109,887 B2
(45) Date of Patent: Aug. 18, 2015

(54) SEMICONDUCTOR INTEGRATED CIRCUIT AND OBJECT-DISTANCE MEASURING APPARATUS

(71) Applicants: Renesas Electronics Corporation, Kawasaki-shi, Kanagawa (JP); Future University Hakodate, Hakodate, Hokkaido (JP)

(72) Inventors: So Otsuka, Kanagawa (JP); Takeshi Nagasaki, Hokkaido (JP); Masashi Toda, Hokkaido (JP)

(73) Assignees: Renesas Electronics Corporation, Kawasaki-shi (JP); Future University Hakodate, Hakodate (JP)

( * ) Notice: Subject to any disclaimer, the term of this patent is extended or adjusted under 35 U.S.C. 154(b) by 379 days.

(21) Appl. No.: 13/754,948

(22) Filed: Jan. 31, 2013

(65) Prior Publication Data

US 2014/0036067 A1    Feb. 6, 2014

(30) Foreign Application Priority Data

Jul. 31, 2012   (JP) ................................ 2012-169102

(51) Int. Cl.
*H04N 7/18*    (2006.01)
*G01C 3/08*    (2006.01)
*G01S 17/48*   (2006.01)

(52) U.S. Cl.
CPC .. *G01C 3/08* (2013.01); *G01S 17/48* (2013.01)

(58) Field of Classification Search
USPC ......... 348/135, 131, 133, 137, 140, 142, 148, 348/151, 169, 118, 120, 126, 25, 46, 47, 49, 348/50, 64, 65, 68, 73, 77, 87, 94, 208.4, 348/208.13, 208.14, 234, 236, 238, 246, 348/252, 258, 289, 354, 366, 370, 396.1, 348/398.1, 425.2, 466, 530, 531, 711, 712, 348/718, 725, 727, 759; 396/104, 106, 123, 396/155, 199; 362/16, 23.1, 23.09, 23.16, 362/551, 555, 611; 356/482, 485, 492, 496, 356/614; 382/114, 145
See application file for complete search history.

(56) References Cited

U.S. PATENT DOCUMENTS 5,771,309 A *   6/1998   Yamaoka et al. ............. 382/152
6,587,183 B1 *  7/2003   Uomori et al. ................ 356/3.1

(Continued)

FOREIGN PATENT DOCUMENTS

JP         2011-007711 A       1/2011

OTHER PUBLICATIONS

Nonami et al, "Proposal on Method of Measuring Distance to Rod-like Object Using In-Vehicle Camera", Feb. 2, 2012.

*Primary Examiner* — Jefferey Harold
*Assistant Examiner* — Mustafizur Rahman
(74) *Attorney, Agent, or Firm* — Miles & Stockbridge P.C.

(57) ABSTRACT

Provided are: a correction object determining section which determines whether, on an imaging plane in image data obtained by imaging an object irradiated with diffusion light from a light source by a camera, a region regarded to be in a state where a rod-like object has been irradiated with the diffusion light exists; a measurement point calculating section which estimates a light source center position of the diffusion light based on information of a luminance distribution of the diffusion light in the image data to set it as a first measurement point; and a distance calculating section which calculates a distance between the object at the first measurement point and the camera according to triangulation based on a horizontal distance between the center of the imaging plane and the first measurement point, the positions of the camera and light source, and an imaging direction angle of the camera.

10 Claims, 6 Drawing Sheets

(56) References Cited

U.S. PATENT DOCUMENTS

| | | | |
|---|---|---|---|
| 6,826,362 B2 * | 11/2004 | Matsuo | 396/104 |
| 7,002,699 B2 * | 2/2006 | Kong et al. | 356/614 |
| 7,095,002 B2 * | 8/2006 | Kong et al. | 250/205 |
| 7,119,930 B1 * | 10/2006 | Carstensen et al. | 358/474 |
| 7,697,746 B2 * | 4/2010 | Kawaguchi | 382/149 |
| 2004/0085549 A1 * | 5/2004 | Smets et al. | 356/614 |
| 2006/0139658 A1 * | 6/2006 | Uetani et al. | 356/601 |
| 2008/0106794 A1 * | 5/2008 | Messina | 359/629 |
| 2008/0137325 A1 * | 6/2008 | Pastore | 362/16 |
| 2009/0167847 A1 * | 7/2009 | Doi | 348/65 |
| 2010/0317920 A1 * | 12/2010 | Doi et al. | 600/109 |

* cited by examiner

SEMICONDUCTOR INTEGRATED CIRCUIT AND OBJECT-DISTANCE MEASURING APPARATUS

CROSS-REFERENCE TO RELATED APPLICATION

The present application claims priority from Japanese Patent Application No. 2012-169102 filed on Jul. 31, 2012, the content of which is hereby incorporated by reference into this application.

TECHNICAL FIELD OF THE INVENTION

The present invention relates to a measuring technique of a distance to an object utilizing a light-section method, for example, to a technique effectively applied to an object-distance measuring apparatus suitable for use in a peripheral monitoring device or the like in an in-vehicle environment and a semiconductor integrated circuit which performs processing in the object-distance measuring apparatus.

BACKGROUND OF THE INVENTION

In a vehicle such as an automobile, in order to contribute to the assistance of driving and the reduction of accidents, a technique for recognizing and detecting the presence of a peripheral object around a vehicle has been studied. For example, as a technique using the light-section method utilizing slit light, Japanese Patent Application Laid-Open Publication No. 2011-7711 (Patent Document 1) describes a three-dimensional shape measuring apparatus which includes a light source array, a camera that images a monitoring region, and an image recognizing section, and measures the shape of a solid object around a vehicle by the light-section method.

In the technique described in Patent Document 1, light emitted from the light source array is regarded as pseudo slit light having an irradiation pattern that includes a line segment obtained by connecting light source centers of lights emitted from respective light sources. In the image recognizing section, a distance at an irradiation position on a solid object from the camera is calculated according to the triangulation principle based on a difference between the irradiation pattern and information of the irradiation position of the pseudo slit light estimated on the basis of luminance data of respective pixel lines from image data imaged with respect to the monitoring region irradiated with the pseudo slit light.

SUMMARY OF THE INVENTION

In the technique described in Patent Document 1, since an existing vehicle-mounted lamp or the like can be used as a light source of the pseudo slit light instead of a light source such as a laser light source and also an existing vehicle-mounted camera such as a rearview camera can be used as the camera for imaging a region irradiated with the pseudo slit light, it is possible to establish a measuring apparatus safely and at a low cost.

In the technique described in Patent Document 1, however, diffusion light from a vehicle-mounted lamp or the like serving as a light source is used, from which the pseudo slit light is obtained. Therefore, depending on a shape (for example, a rod-like object) and a position of an object to be measured, a correct irradiation position of pseudo slit light cannot be determined due to irradiation of the diffusion light on the object, and error occurs in the result of distance measurement in some cases. Other problems and novel features will become apparent from the description in this specification and the accompanying drawings.

An object-distance measuring apparatus according to an embodiment includes: a correction object determining section which determines whether or not, on an imaging plane in image data obtained by imaging an object irradiated with diffusion light from a light source by a camera, a region which can be regarded to be in a state where a rod-like object has been irradiated with the diffusion light exists; a measurement point calculating section which estimates a light source center position of the diffusion light based on information of a luminance distribution of the diffusion light in the image data to set the light source center position as a measurement point; and a distance calculating section which calculates a distance between the object at the measurement point and the camera or the light source according to triangulation based on a horizontal distance between the center of the imaging plane in the image data and the measurement point, the positions of the camera and light source, and an imaging direction angle of the camera.

According to the embodiment, an error in the result of distance measurement which may occur depending on the shape and the position of the object to be measured due to the use of diffusion light as a light source can be reduced.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that the same components are denoted by the same reference symbols throughout the drawings for describing the embodiments, and the repetitive description thereof will be omitted.

In an object-distance measuring apparatus according to the present embodiment, a light source of diffusion light and a camera that images a region which is irradiated with the light from the light source to acquire image data are used to measure a distance between an object existing in the region which is irradiated with the light and the camera by utilizing pseudo slit light obtained from the diffusion light by a light-section method. As the light source, for example, a tail lamp, a brake lamp, a back lamp or the like which is mounted on a vehicle such as an automobile can be used, and as the camera, when there is a camera mounted for monitoring rearward of a vehicle, the camera can be used. Therefore, it is possible to establish the object-distance measuring apparatus by use of existing devices mounted on a vehicle such as an automobile at a low cost.

Further, as described later, in the object-distance measuring apparatus according to the present embodiment, since a case where an error may occur in the result of distance measurement due to the irradiation of diffusion light on an object, such as the case where an object has a rod-like shape or the like or the case where the position of an object deviates from the position of the pseudo slit light, is detected and a distance is measured after a predetermined correction has been performed, an error can be reduced.

Figure 1:
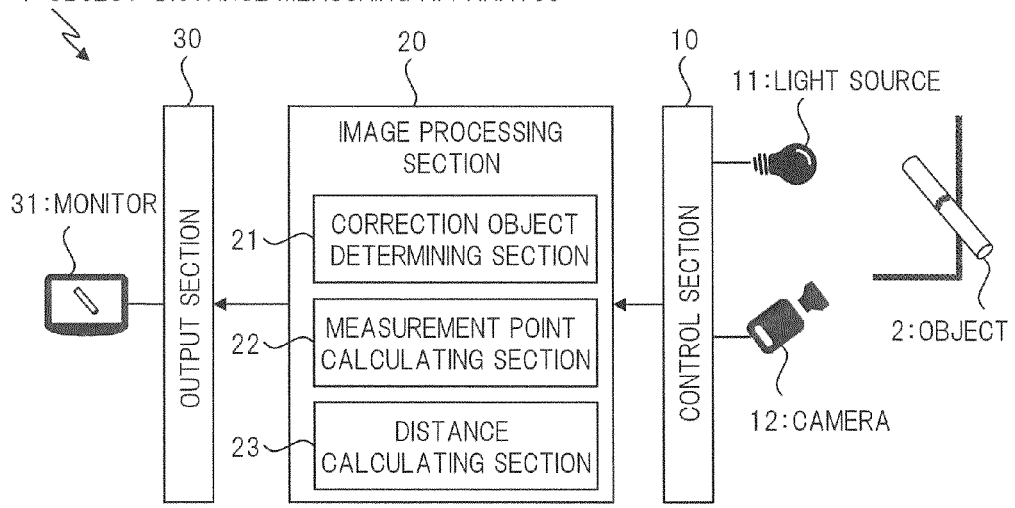
FIG. 1 is a diagram showing an outline of a configuration example of an object-distance measuring apparatus according to an embodiment.

FIG. 1 is a diagram showing an outline of a configuration example of an object-distance measuring apparatus according to the present embodiment. An object-distance measuring apparatus 1 is an apparatus which includes respective sections mounted as a semiconductor integrated circuit or software, such as a control section 10, an image processing section 20, and an output section 30, and a light source 11 and a camera 12, and measures a distance to a peripheral object 2 by the light-section method. Further, the object-distance measuring apparatus 1 may have a monitor 31 for displaying a measurement result. As described above, the object-distance measuring apparatus 1 is mounted on a vehicle such as an automobile to measure a distance to the object 2 in a monitoring region around the vehicle and display the measurement result on the monitor 31. In addition to displaying, the behavior of the vehicle itself may be controlled based on the measurement result.

The light source 11 is made up of, for example, an LED (light emitting diode) illumination tool or the like which is widely used as a vehicle-mounted lamp or the like, and it generates slit light for performing a light-section method to irradiate the monitoring region with the slit light. Since the light emitted from the light source 11 is not laser beam but diffusion light, this is to be handled as pseudo slit light resembling the slit light according to the method described later. The camera 12 is a digital video camera or a digital camera which can image a situation of irradiation to the object 2 from the light source 11 in the monitoring region to acquire the same as image data, and a vehicle-mounted rearview monitoring camera can be used as the camera 12. The control section 10 controls operations of the light source 11 and the camera 12 (for example, turning-on and turning-off of the light source 11 and imaging operation of the camera 12).

The image processing section 20 has respective sections such as a correction object determining section 21, a measurement point calculating section 22, and a distance calculating section 23. A main processing in the object-distance measuring apparatus 1 such as the analysis of image data imaged by the camera 12 (image data in which the state where the object 2 is irradiated with light from the light source 11 is imaged) and the calculation of the distance to the object 2 according to the triangulation principle using the light-section method is performed by these respective sections.

The correction object determining section 21 analyzes the image data imaged by the camera 12 to determines whether or not the object 2 lies in a state where an error may occur in the result of distance measurement (whether or not correction is required for the object 2). The measurement point calculating section 22 analyzes the image data imaged by the camera 12, specifies positions where the object 2 is irradiated with the pseudo slit light from the light source 11 for respective scanning lines in a horizontal direction, and sets the positions as measurement points for measuring the distance according to the triangulation. When the correction object determining section 21 determines that the object 2 lies in the state where an error may occur in the result of distance measurement, predetermined correction is performed with respect to the measurement points. The distance calculating section 23 calculates the distance to the object 2 according to the triangulation based on respective measurement points calculated by the measurement point calculating section 22. Processing in the respective sections of the image processing section 20 will be described in detail later.

The output section 30 outputs the measurement result of the distance to the object 2 in the image processing section 20 to the monitor 31 or the like. For example, information about the measured distance can be displayed on the monitor 31 together with an image of the monitoring region behind the vehicle which has been imaged (is being imaged) by the camera 12. Also, when the vehicle comes very close to the object 2, control to stop the vehicle or the like can be performed by outputting the result of distance measurement to a mechanism (not shown) for controlling the behavior of the vehicle.

Figure 2:
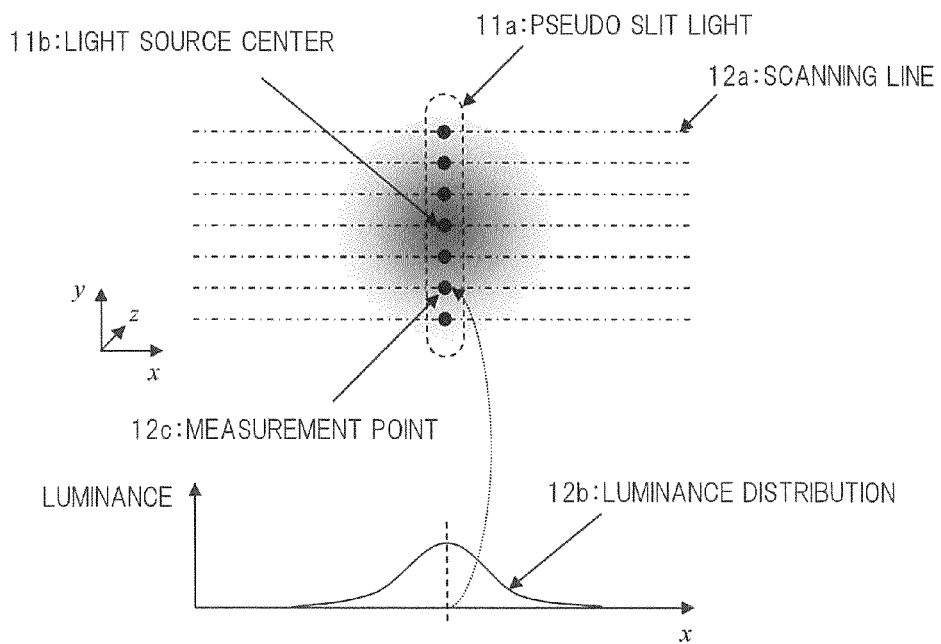
FIG. 2 is a diagram for describing an outline of handling of pseudo slit light and measurement points according to an embodiment.

FIG. 2 is a diagram for describing an outline of handling of the pseudo slit light and the measurement point according to the present embodiment. Incidentally, in the descriptions in FIG. 2 and figures subsequent thereto, a direction of irradiation of light from the light source 11 is defined as a z direction and a plane perpendicular to the z direction is defined as an x-y plane (x axis is a horizontal direction). The example in FIG. 2 shows image data imaged by the camera 12 when a plate-like object 2 exists on the x-y plane, namely, when whole diffusion light from the light source 11 centered at the light source center 11b is irradiated on the x-y plane.

The light-section method using slit light cannot be applied when such diffusion light remains as it is. In this embodiment, therefore, a line extending in a vertical direction (y direction) of a portion near the center with the highest luminance of the diffusion light from the light source 11 is handled as pseudo slit light 11a, with which the light-section method is applied.

More specifically, by assuming that the luminance of the diffusion light shows a two-dimensional normal distribution of x-y and by taking a plurality of scanning lines 12a along the x direction, luminance distributions 12b (normal distributions) on the respective scanning lines 12a are calculated. Here, from the distribution of the actual luminance data of respective pixels on the scanning line 12a, a maximum likelihood estimation of a normal distribution curve is performed by using, for example, EM (expectation-maximization) algorithm or the like. Further, a line obtained by calculating positions corresponding to peaks of normal distributions on the respective scanning lines 12a and connecting the positions is handled as the pseudo slit light 11a. Therefore, when the object 2 is irradiated with the pseudo slit light 11a, positions corresponding to peaks of the normal distributions of luminance on the respective scanning lines 12a constitute measurement points 12c (irradiation position of the pseudo slit light 11a to the object 2) in the triangulation.

Figure 3:
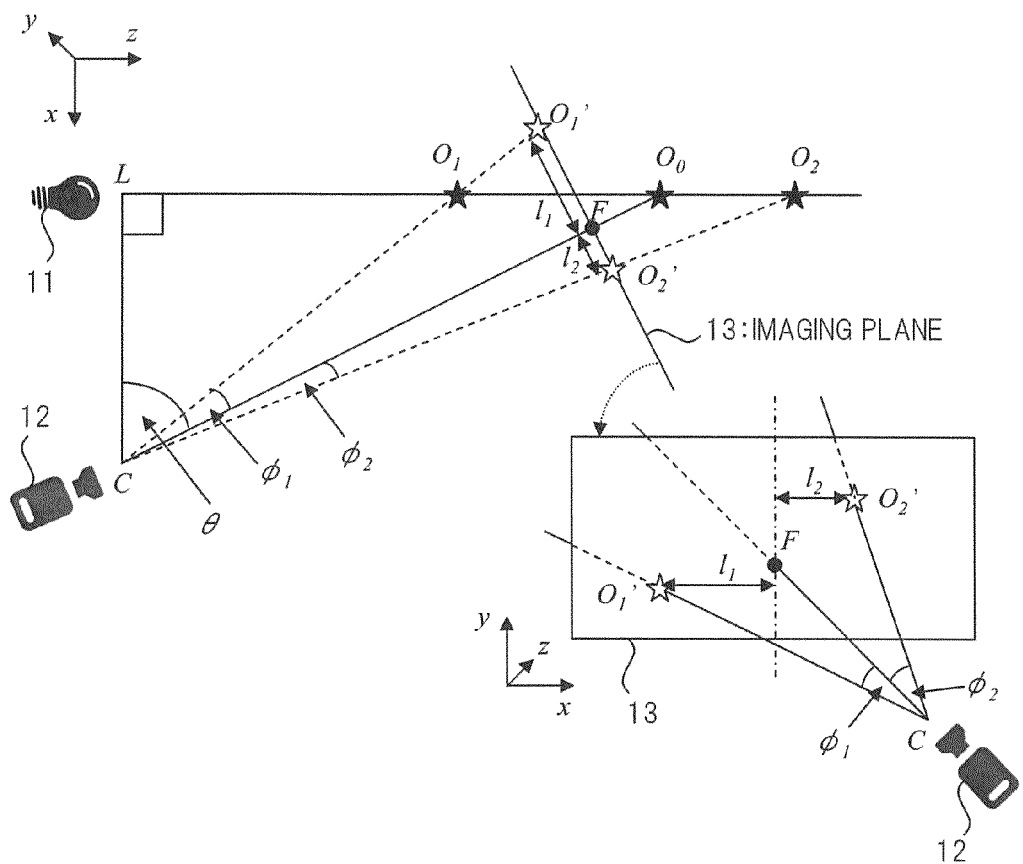
FIG. 3 is a diagram for describing an outline of triangulation in a light-section method according to an embodiment.

FIG. 3 is a diagram for describing an outline of triangulation in the light-section method according to the present embodiment.

FIG. 3 shows a state on the x-z plane, where the light source 11 and the camera 12 are arranged at a position L and a position C along the x-axis direction, respectively, and the light source 11 irradiates the pseudo slit light 11a as shown in FIG. 2 in the z-axis direction perpendicular to the x axis. The orientation of the camera 12 is adjusted so as to take an image in an irradiation direction of the pseudo slit light 11a from the light source 11, and an image center F on an imaging plane 13 of the camera 12 serves as a reference point of distance measurement by the triangulation.

More specifically, when the measurement point 12c is located at a position of the image center (the image center F in the example shown in FIG. 3), the object 2 is at a position $O_0$, so that a distance $CO_0$ between the camera 12 and the object 2 takes a known value which can be calculated from known parameters such as a distance LC between the light source 11 and the camera 12 and an angle θ of the imaging direction of the camera 12 (the distance is the same as a focal distance CF when the focal position rests on an optical axis of the pseudo slit light 11a).

On the other hand, when the measurement point 12c is located at a position $O_1'$ on the left side of the image center in the horizontal direction, the object 2 is eventually at a position $O_1$ close to the camera 12, so that a distance $CO_1$ between the camera 12 and the object 2 can be calculated from the distance LC and an angle $(θ-Φ_1)$. Incidentally, the angle $Φ_1$ can be calculated from a horizontal distance $l_1$ between the image center and the position $O_1'$ on the imaging plane 13 and the focal distance CF. Similarly, when the measurement point 12c is located at a position $O_2'$ on the right side of the image center F in the horizontal direction, the object 2 is at a position $O_2$ far from the camera 12, so that a distance $CO_2$ between the camera 12 and the object 2 can be calculated from the distance LC and an angle $(θ+Φ_2)$. Incidentally, in this embodiment, the distance from the camera 12 to the object 2 is measured as the distance to the object 2, but the distance from the light source 11 may be measured as the distance to the object 2.

Figure 4:
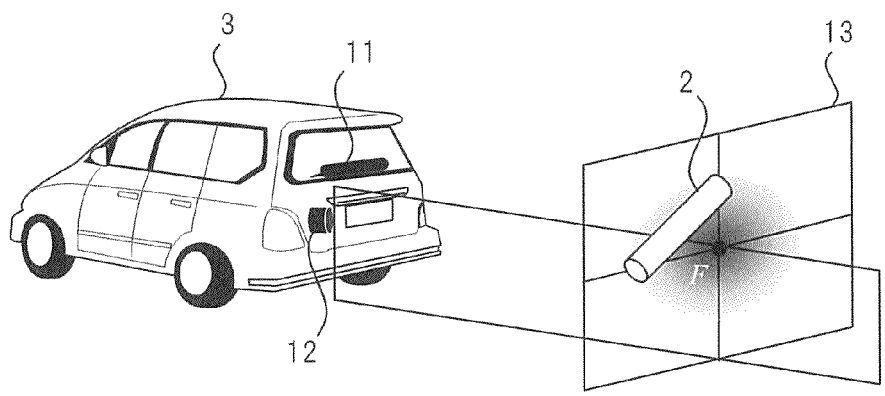
FIG. 4 is a diagram showing an outline of an example of measurement of a distance to an object according to an embodiment.

FIG. 4 is a diagram showing an outline of an example of measurement of a distance to the object 2 according to the present embodiment. In the example shown in FIG. 4, the object-distance measuring apparatus 1 according to this embodiment is mounted on a vehicle 3 and a tail lamp and a rearview camera are used as the light source 11 and the camera 12, respectively. Further, FIG. 4 shows that the object 2 has a rod-like shape. It is not rare that such a rod-like obstacle exists around the vehicle. Incidentally, in addition to the case where the object 2 which is a rod-like object exists on a projection plane of light from the light source 11 as shown in FIG. 4, there may be a state where the object 2 is projected on the projection plane as a rod-like object (state similar to that irradiating a rod-like object with the light from the light source 11). In these states, since the pseudo slit light 11a from the light source 11 is actually diffusion light, deviation occurs in the determination of the measurement points 12c, and as a result, an error occurs in distance measurement in some cases.

Figure 5A:
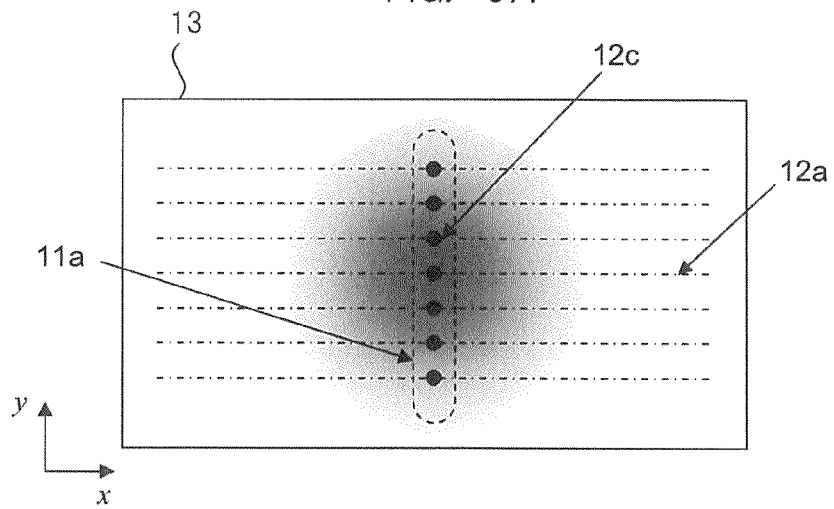
FIG. 5A is a diagram for describing an example of deviation of a measurement point according to an embodiment.
Figure 5B:
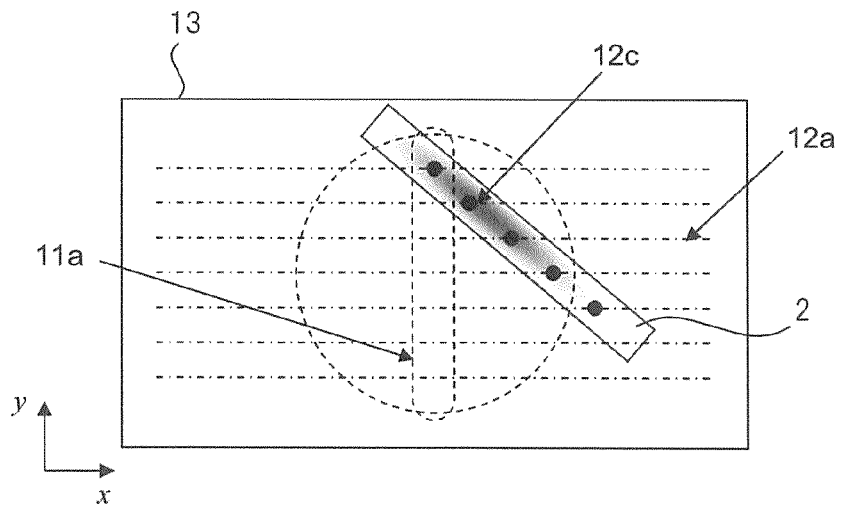
FIG. 5B is a diagram for describing an example of deviation of a measurement point according to an embodiment.
Figure 5C:
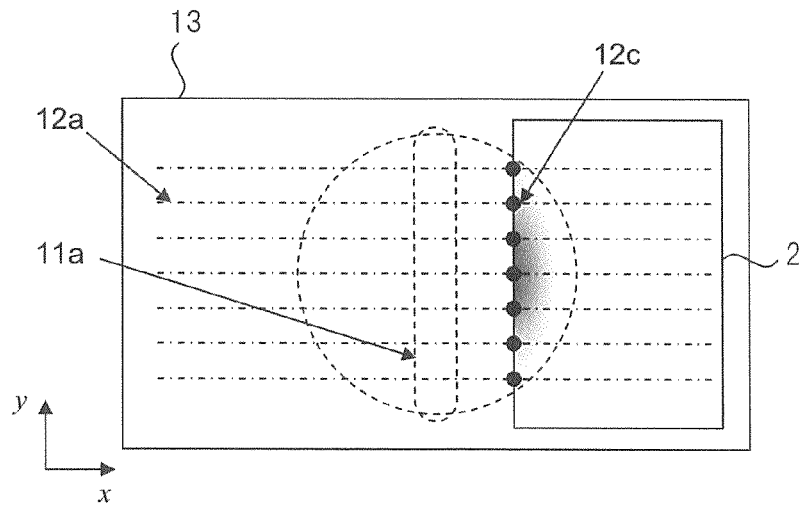
FIG. 5C is a diagram for describing an example of deviation of a measurement point according to an embodiment.

FIGS. 5A to 5C are diagrams for describing an example of the deviation of the measurement point 12c according to the present embodiment. For example, FIG. 5A shows a state where a plate-like object 2 positioned on the x-y plane of the imaging plane 13 is irradiated with diffusion light from the light source 11 like the case shown in FIG. 2. In this case, respective measurement points 12c are calculated in the portion determined as the pseudo slit light 11a. More specifically, since the respective measurement points 12c are obtained by actually irradiating the object 2 with the pseudo slit light 11a, the distance to the plate-like object 2 can be properly measured based on the respective measurement points 12c.

On the other hand, FIG. 5B shows a state where a rod-like object 2 existing in a state as shown in FIG. 4 is irradiated with diffusion light from the light source 11. In this case, a region of the object 2 does not exist on the portions determined as the pseudo slit light 11a on the respective scanning lines 12a, but the region of the object 2 exists on other portions. Since these portions are not irradiated with light if the light is real slit light which is not the diffusion light, they should not be calculated as the measurement points 12c, and therefore, the state where the measurement points 12c do not exist on these scanning lines 12a should be determined. However, since the pseudo slit light 11a is actually diffusion light, as illustrated, the positions on the object 2 irradiated with a diffusion portion of the diffusion light are eventually calculated as the measurement points 12c.

Figure 6:
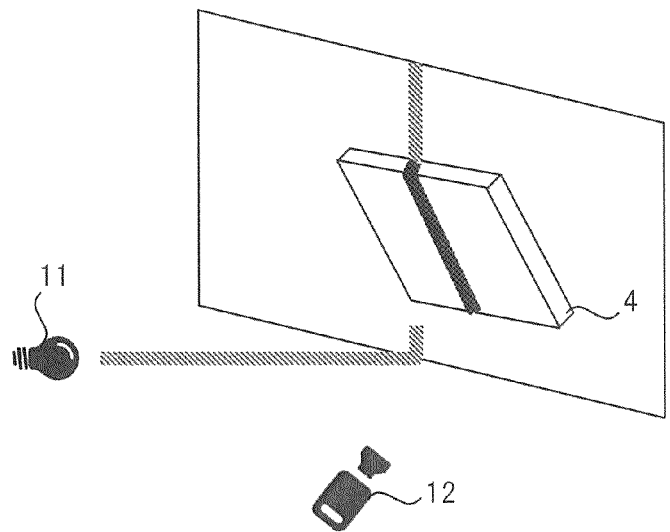
FIG. 6 is a diagram showing an outline of an example where an error occurs in distance measurement in a related art.

As a result, since these measurement points 12c are positioned on the right side of the image center, it is determined in the related art that the object 2 exists at a farther position as shown in FIG. 3, and an error occurs in the result of distance measurement. FIG. 6 is a diagram showing an outline of an example where an error occurs in distance measurement in a related art. More specifically, in the case of the example shown in FIG. 5B, for example, a measurement result similar to a case where a plate-like object 4 exists in a state where an upper portion thereof is inclined toward the light source 11 and the camera 12 as shown in FIG. 6 is obtained.

In FIG. 5B, the case where the object 2 is a rod-like object is shown as an example, but such a situation may occur even when the object 2 is not the rod-like object. For example, FIG. 5C shows a state where a rectangular parallelepiped object 2 as an object having a shape other than a rod-like shape exists in a state of deviating from the portion determined as the pseudo slit light 11a to the right side. Also in this case, since the pseudo slit light 11a is actually diffusion light like the case described above, a left end portion of the object 2 which is not included in the portion determined as the pseudo slit light 11a is calculated as the measurement point 12c, and as a result, an error occurs in the result of distance measurement like the case described above.

As described above, in the shape and the arrangement state of the object 2 that cause the state where a region of the object 2 does not exist at an irradiation position of a portion determined as the pseudo slit light 11a on the respective scanning lines 12a on the imaging plane 13 and the region of the object 2 exists at other portions, the measurement points 12c for measuring the distance by triangulation cannot be measured correctly. As a result, an error occurs in the measurement result of the distance of the object 2 at a height position of the scanning line 12a.

Therefore, in this embodiment, a center position of irradiation from the light source 11 is estimated from a situation (luminance distribution) of irradiation of diffusion light to the object 2, and this is set as the measurement point 12c. More specifically, assuming that a flat plate like that in the example shown in FIG. 5A exists at the position of the object 2, a position corresponding to the center of diffusion light (center of the pseudo slit light 11a) from the light source 11 irradiating the flat plate is estimated, and this is set as the measurement point 12c for the object 2. In this manner, a plurality of measurement points 12c which are calculated on respective scanning lines 12a when the related art is used are converted to one measurement point 12c (center position of the light source 11).

Figure 7:
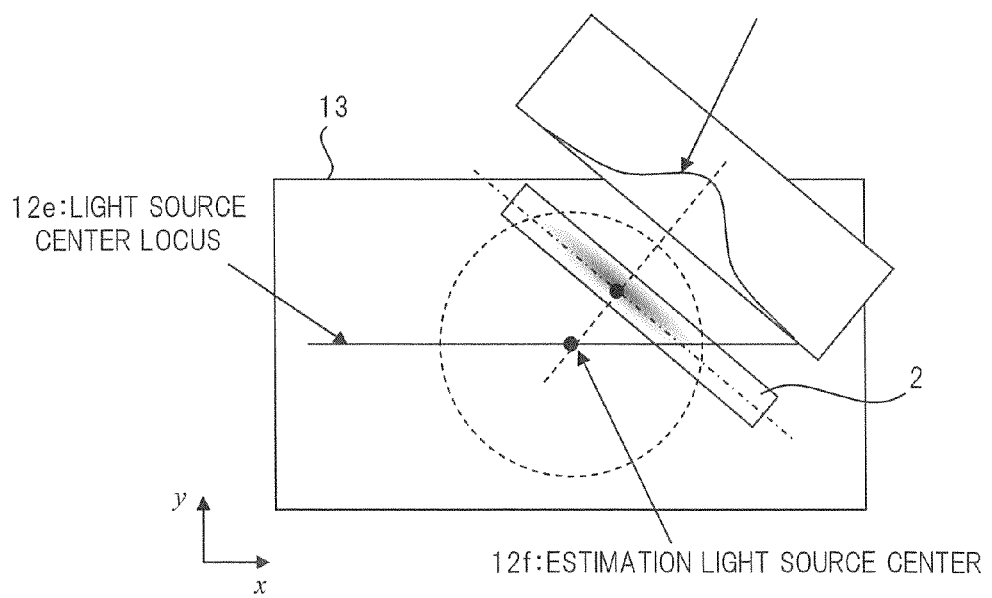
FIG. 7 is a diagram for describing an outline of an example of a method for estimating a center position of a light source according to an embodiment.

FIG. 7 is a diagram for describing an outline of an example of a method for estimating a center position of the light source 11 according to this embodiment. For example, when a rod-like object 2 exists (is being imaged) on the imaging plane 13 like the example shown in FIG. 5B, normal distribution estimation of the luminance distribution is performed along an axial direction of the rod-like object 2 to obtain an axial luminance distribution 12$d$. An intersection point between a normal line passing through the position of the peak of the axial luminance distribution 12$d$ on an axis of the object 2 to be perpendicular to the axial direction of the object 2 and a light source center locus 12$e$ showing a locus which the center position of the light source 11 can take on the imaging plane 13 is set as an estimation light source center 12$f$ (namely, measurement point 12$c$) for the object 2.

Here, the light source center locus 12$e$ is a straight line showing a locus of the irradiation position of the light source center in accordance with the distance to the object 2, and it shows a locus of movement of the center position of the light source 11 when the distance to the object 2 is changed (for example, the plate-like object 2 is moved along the z axis) in a state of irradiating the plate-like object 2 arranged on the x-y plane with the diffusion light from the light source 11 like the example shown in FIG. 5A. For example, by obtaining center positions of the light source 11 in advance by irradiating the plate-like object 2 with the diffusion light from the light source 11 at at least two positions having difference distances, the straight line of the light source center locus 12$e$ can be approximately obtained from these center positions.

Figure 8:
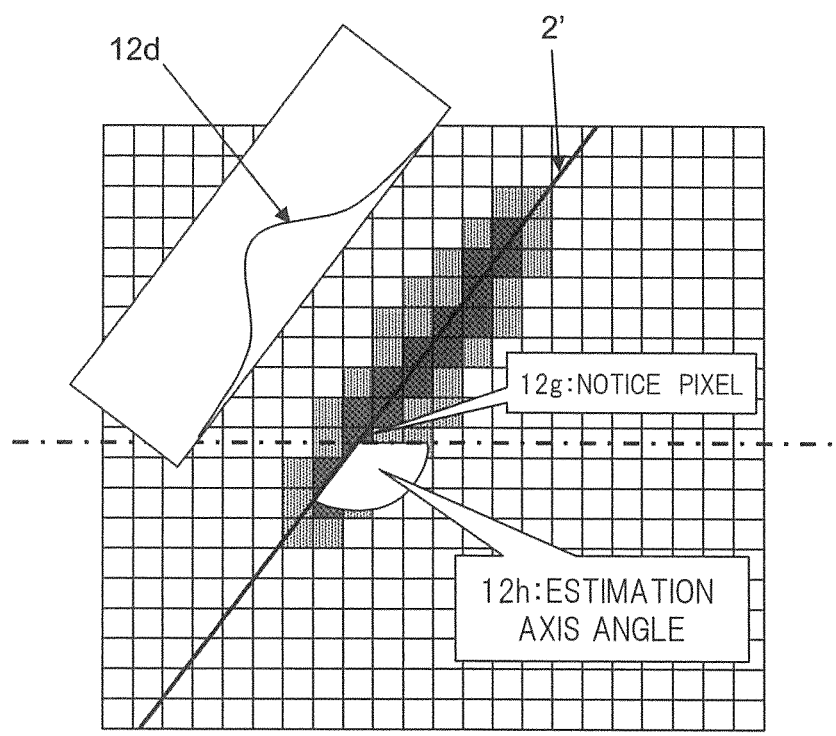
FIG. 8 is a diagram for describing an outline of an example of a method for estimating an axis of a rod-like object according to an embodiment.

FIG. 8 is a diagram for describing an outline of an example of a method for estimating an axis of the rod-like object 2 according to the present embodiment. When the estimation light source center 12$f$ (namely, the measurement point 12$c$ in this case) is to be obtained by the method shown in the example in FIG. 7, it is necessary to estimate the axis of the rod-like object 2. In this embodiment, for example, by utilizing the feature that the luminance distribution of the region of the rod-like object 2 on the imaging plane 13 becomes longest in the axial direction of the object 2, the axis of the object 2 is estimated from an angle at which the width of the luminance distribution becomes largest.

Specifically, for example, pixels whose luminance values exceed a predetermined threshold are extracted as notice pixels 12$g$, and for each of the notice pixels 12$g$, a plurality of straight lines having a rotation angle from 0° to 179° (for example, in increments of 1°) centered at the notice pixel 12$g$ are considered. For each of the straight lines, normal distribution estimation of luminance distributions of pixels on the respective straight lines is performed to obtain an angle at which the width of the normal distribution becomes largest, and this is set as an estimation axis angle 12$h$ of the notice pixel 12$g$.

The estimation axis angle 12$h$ is obtained for each of the notice pixels 12$g$, and the notice pixels 12$g$ having the same value as the value of the estimation axis angle 12$h$ with the highest appearance frequency (or a value falling within a fixed range centered around the value) as the estimation axis angle 12$h$ are extracted. By applying the straight-line approximation to a group of the extracted notice pixels 12$g$, an object estimation axis 2' can be obtained. Thereafter, as described above, normal distribution estimation is performed to the luminance distribution on the object estimation axis 2' to acquire the axial luminance distribution 12$d$, and a normal line to the object estimation axis 2' is drawn from a position corresponding to the peak of the normal distribution. An intersection point between the normal line and the light source center locus 12$e$ is set as the estimation light source center 12$f$.

In the method described above, the axis of the rod-like object 2 is estimated based on luminance distributions on the straight lines passing through the respective notice pixels 12$g$. According to this method, the object estimation axis 2' can be virtually obtained by straight-line approximation not only in the case where the object 2 is a linear rod-like object but also in the case where it has a curved line, a bend or the like. Further, even when correction must be performed due to the position of the object 2 like an example shown in FIG. 5C, the object estimation axis 2' and the estimation light source center 12$f$ can be obtained by the similar method by assuming as if the rod-like object 2 exists at the position including the measurement points 12$c$. Incidentally, it goes without saying that the above-described estimation method of the estimation light source center 12$f$ (including the estimation method of the object estimation axis 2' and others) is one example and another estimation method can be used.

Figure 9:
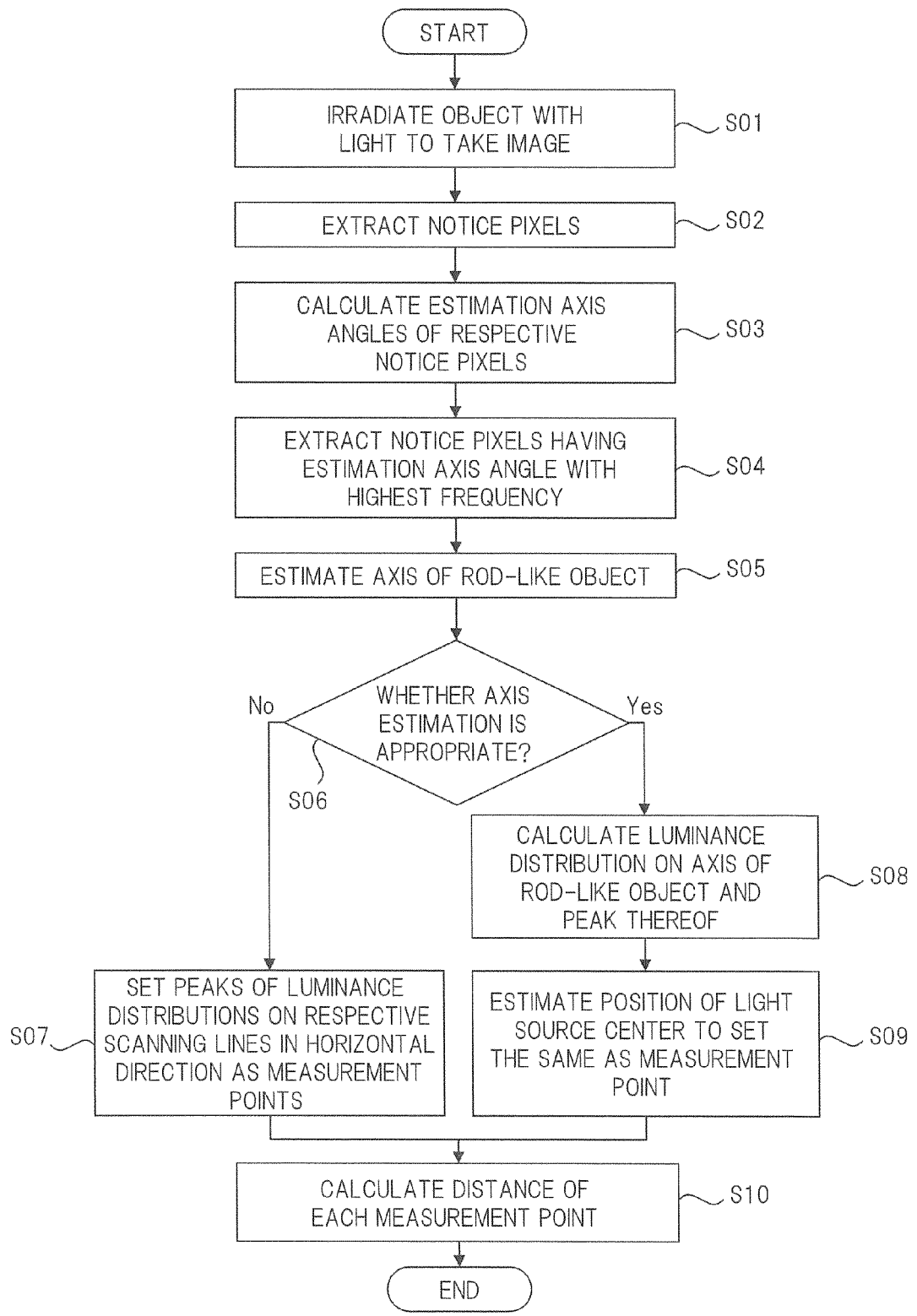
FIG. 9 is a flowchart showing an example of a process flow for measuring a distance to an object according to an embodiment.

FIG. 9 is a flowchart showing an example of a process flow for measuring a distance to the object 2 according to the present embodiment. When the processing for distance measurement starts, the object-distance measuring apparatus 1 first causes the control section 10 to lighten the light source 11 to irradiate the object 2 positioned in the monitoring region with light and also image the state of the object 2 irradiated with light by the camera 12 (S01). Obtained image data is delivered to the image processing section 20. Operations of the light source 11 and the camera 12 may be continued or stopped according to need.

The image processing section 20 which has acquired the image data causes the correction object determining section 21 to determine whether or not the rod-like object 2 to be corrected exists in the image data according to the method shown in FIG. 8. Specifically, as described above, for each of the pixels on the image data, pixels whose luminance values are equal to or more than a predetermined threshold are extracted as notice pixels 12$g$ (S02). Next, for each of the notice pixels 12$g$ extracted at Step S02, a plurality of straight lines having a rotation angle from 0° to 179° (in increments of 1°) centered at each of the notice pixels 12$g$ are set, and normal distribution estimation is performed to luminance distributions on the respective straight lines to determine the angle at which the width of the normal distribution becomes largest as the estimation axis angle 12$h$ of the notice pixel 12$g$ (S03).

Thereafter, with respect to the notice pixels 12$g$ extracted at Step S03, the notice pixels 12$g$ having the same value as the value of the estimation axis angle 12$h$ with the highest appearance frequency (or a value falling within a fixed range centered around the value) as the estimation axis angle 12$h$ are extracted (S04). Further, by applying a straight-line approximation to a group of the notice pixels 12$g$ extracted at Step S04 according to an arbitrary method, the object estimation axis 2' is calculated (S05). Thereafter, it is determined whether or not the object estimation axis 2' estimated at Step S05 is appropriate (S06).

For example, in a case where the straight-line approximation is not appropriate, such as the case where the degree of dispersion of the respective notice pixels 12$g$ from the obtained approximation straight line is equal to or larger than a predetermined threshold or the case where the number of extracted notice pixels 12$g$ is less than a predetermined number, it is determined that a region which can be regarded to be in a state where the rod-like object 2 has been irradiated with diffusion light cannot be detected (the rod-like object 2 to be corrected does not exist), and the distance to the object 2 is measured by a method similar to the related art without performing the correction according to the present embodiment. More specifically, normal distribution estimation is performed to the luminance distributions of pixels on the respective scanning lines 12a by the measurement point calculating section 22 to set the positions of the peaks of the normal distributions as the measurement points 12c (S07), and the distance to the object 2 is calculated according to the triangulation by the distance calculating section 23 for each of the measurement points 12c (S10).

On the other hand, when the object estimation axis 2' estimated at Step S05 is appropriate (or except the case where the object estimation axis 2' is inappropriate), it is determined that a region which can be regarded to be in a state where the rod-like object 2 has been irradiated with diffusion light can be detected. Then, normal distribution estimation is performed to the luminance distributions of the pixels on the object estimation axis 2' to acquire an axial luminance distribution 12d and calculate a position corresponding to the peak of the normal distribution by the measurement point calculating section 22 (S08). Further, a normal line to the object estimation axis 2' is calculated from the position of the peak obtained at Step S08, and the estimation light source center 12f is obtained from an intersection point between the normal line and the straight line of the light source center locus 12e calculated in advance to set the estimation light source center 12f as the measurement point 12c (S09).

Thereafter, a distance to the object 2 is calculated according triangulation with respect to the measurement point 12c by the distance calculating section 23 (S10). For example, information about the obtained distance can be displayed on the monitor 31 along with the image data obtained by the camera 12 by the output section 30 or can be used for the control of the vehicle.

As described above, by estimating the center position of the light source 11 to correct the measurement point 12c in accordance with situations such as that the object 2 is a rod-like object and an arrangement position thereof deviates, it is possible to measure the distance to the object 2 more properly. In order to confirm this point, the applicant performed experiments for measuring the distance to the object 2 in both of the case where the above-described method for correction process was used and the case where the above-described method was not used (the related art was used), respectively.

In the experiments, a general LED lamp was used as the light source 11 and a general Web camera (acquiring image data with 128×96 pixels) used by connecting with a personal computer or the like via USB (universal serial bus) was used as the camera 12. These were fixed at positions separated from each other by a distance of 17 cm so as to have a positional relationship similar to the example shown in FIG. 2, and the measurement of the distance according to the related art and the measurement of the distance using the correction method of the present embodiment were performed for the case (1) where the rod-like object 2 was arranged at a position separated from the camera 12 by a distance of 44 cm and for the case (2) where the rod-like object 2 was arranged at a position separated from the camera 12 by 35 cm, respectively, and then, the measurement results thereof were compared with each other.

Incidentally, the arrangement situation of the object 2 in the above experiment (1) was similar to that shown in FIG. 5B, in which a portion of the object 2 existed on the right side of a portion determined as the pseudo slit light 11a. Further, in the above experiment (2), the arrangement situation of the object 2 was right-left reversed from that shown in FIG. 5B, in which the portion of the object 2 existed on the left side of the pseudo slit light 11a.

As the results of distance measurements, in the related art, different distances were measured for respective measurement points 12c on the respective scanning lines 12. More specifically, they were in a range of 86 cm to 137 cm in the experiment (1) and were in a range of 24 cm to 37 cm in the experiment (2), and the variations were observed in the measurement results. Further, the error was significantly large in the experiment (1). On the other hand, in the method according to the present embodiment, since the measurement point 12c was at one point of the estimation light source center 12f, no variation occurred in the measurement results, and the distances were 47 cm in the experiment (1) and 29 cm in the experiment (2), and the measurement with reduced error could be achieved.

As described above, in the object-distance measuring apparatus 1 according to the present embodiment, for example, the pseudo slit light 11a is obtained by utilizing a tail lamp mounted on a vehicle such as an automobile as the light source 11 to irradiate the object 2 existing in a monitoring region with the pseudo slit light 11a, and a camera for monitoring the rearview similarly mounted on the vehicle is used as the camera 12, so that a distance between the object 2 and the camera 12 can be measured by the light-section method. At this time, for example, cases where an error may occur in a result of distance measurement such as a case where the object 2 has a rod-like shape and a case where the position of the object 2 deviates from the position of the pseudo slit light 11a are detected, and positions of the measurement points 12c are corrected to a position of the estimation light source center 12f, so that the error in these cases can be reduced.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A semiconductor integrated circuit comprising:
   a correction object determining section which determines whether or not, on an imaging plane in image data obtained by imaging an object irradiated with diffusion light from a light source by a camera, a region which can be regarded to be in a state where a rod-like object has been irradiated with the diffusion light exists;
   a measurement point calculating section which, when the region which can be regarded to be in a state where the rod-like object has been irradiated with the diffusion light exists on the imaging plane in the image data, estimates a light source center position of the diffusion light based on information of a luminance distribution of the diffusion light in the image data to set the light source center position as a first measurement point; and
   a distance calculating section which calculates a distance between the object at the first measurement point and the camera or the light source according to triangulation based on a horizontal distance between a center of the imaging plane in the image data and the first measurement point, positions of the camera and the light source, and an imaging direction angle of the camera.

2. The semiconductor integrated circuit according to claim 1,
   wherein, when the region which can be regarded to be in a state where the rod-like object has been irradiated with the diffusion light does not exist on the imaging plane in the image data, the measurement point calculating section sets peak positions of luminance distributions of the diffusion light on a plurality of scanning lines in a horizontal direction in the image data as respective second measurement points, and the distance calculating section calculates distances between the object at the respective second measurement points and the camera or the light source according to triangulation based on horizontal distances between the center of the imaging plane in the image data and the respective second measurement points, the positions of the camera and the light source, and the imaging direction angle of the camera.

3. The semiconductor integrated circuit according to claim 1, wherein, with respect to notice pixels having luminance equal to or more than a predetermined threshold in the image data, the correction object determining section calculates, as an estimation axis angle, an angle at which a width of a luminance distribution curve of pixels on a straight line of straight lines passing through the notice pixels becomes largest, and with respect to the respective notice pixels, extracts the notice pixels having the estimation axis angle having the same value as the estimation axis angle with the highest frequency, and when straight-line approximation is possible for the position of the extracted notice pixel, determines that the region which can be regarded to be in a state where the rod-like object has been irradiated with the diffusion light exists on the imaging plane in the image data.

4. The semiconductor integrated circuit according to claim 3, wherein, with respect to an object estimation axis obtained by straight-line approximation from the extracted notice pixels, the correction object determining section estimates, as the light source center position, an intersection point between a normal line passing through a position corresponding to the peak of a luminance distribution of pixels on the object estimation axis to be perpendicular to the object estimation axis and a straight line obtained in advance showing a locus of an irradiation position of the light source center of the diffusion light on the imaging plane in accordance with the distance to the object.

5. An object-distance measuring apparatus comprising:
a light source which irradiates an object with diffusion light;
a camera which images the object irradiated with the diffusion light to obtain image data;
a control section which controls operations of the light source and the camera; and
the semiconductor integrated circuit according to claim 2.

6. The object-distance measuring apparatus according to claim 5, further comprising an output section which outputs information about a distance between the object and the camera or the light source calculated by the semiconductor integrated circuit by a predetermined method.

7. The object-distance measuring apparatus according to claim 5, wherein the light source is a back lamp, a brake lamp, or a tail lamp mounted on a vehicle or an LED lamp constituting another lamp for illuminating outside the vehicle, and the camera is a rearview camera mounted on the vehicle.

8. An object-distance measuring apparatus comprising:
a light source which irradiates an object with diffusion light;
a camera which images the object irradiated with the diffusion light to obtain image data;
a control section which controls operations of the light source and the camera; and
the semiconductor integrated circuit according to claim 4.

9. The object-distance measuring apparatus according to claim 8, further comprising an output section which outputs information about a distance between the object and the camera or the light source calculated by the semiconductor integrated circuit by a predetermined method.

10. The object-distance measuring apparatus according to claim 9, wherein the light source is a back lamp, a brake lamp, or a tail lamp mounted on a vehicle or an LED lamp constituting another lamp for illuminating outside the vehicle, and the camera is a rearview camera mounted on the vehicle.

* * * * *